United States Patent [19]

Byars et al.

[11] Patent Number: 4,802,161
[45] Date of Patent: Jan. 31, 1989

[54] PACKET BUS INTERFACE

[75] Inventors: Steven J. Byars, Chantilly, Va.; William N. Carr, Newark, N.J.

[73] Assignee: GTE Communication Systems Corporation, Phoenix, Ariz.

[21] Appl. No.: 908,055

[22] Filed: Sep. 16, 1986

[51] Int. Cl.[4] .............................................. H04J 3/26
[52] U.S. Cl. .................................................... 370/94
[58] Field of Search ............................ 370/94, 85, 86; 340/825.05, 825.5, 825.52

[56] References Cited

U.S. PATENT DOCUMENTS

| 4,292,623 | 9/1981 | Eswaran et al. | 370/94 |
| 4,458,314 | 7/1984 | Grimes | 764/200 |
| 4,490,788 | 12/1984 | Rasmussen | 364/200 |
| 4,525,830 | 6/1985 | Cohen et al. | 370/89 |
| 4,550,402 | 10/1985 | Gable et al. | 370/85 |
| 4,583,219 | 4/1986 | Riddle | 370/94 |
| 4,623,886 | 11/1986 | Livingston | 370/94 |

Primary Examiner—Douglas W. Olms
Assistant Examiner—Melvin Marcelo
Attorney, Agent, or Firm—Gregory G. Hendricks

[57] ABSTRACT

The Arbitrated Bus Interface (ABI) is a set of custom LSI circuits which sends and receives minipackets of binary information to and from a data bus. The ABI performs arbitration, address recognition, and buffering required for transmitting and receiving mini-packets of information between the local packet bus and a microprocessor.

2 Claims, 9 Drawing Sheets

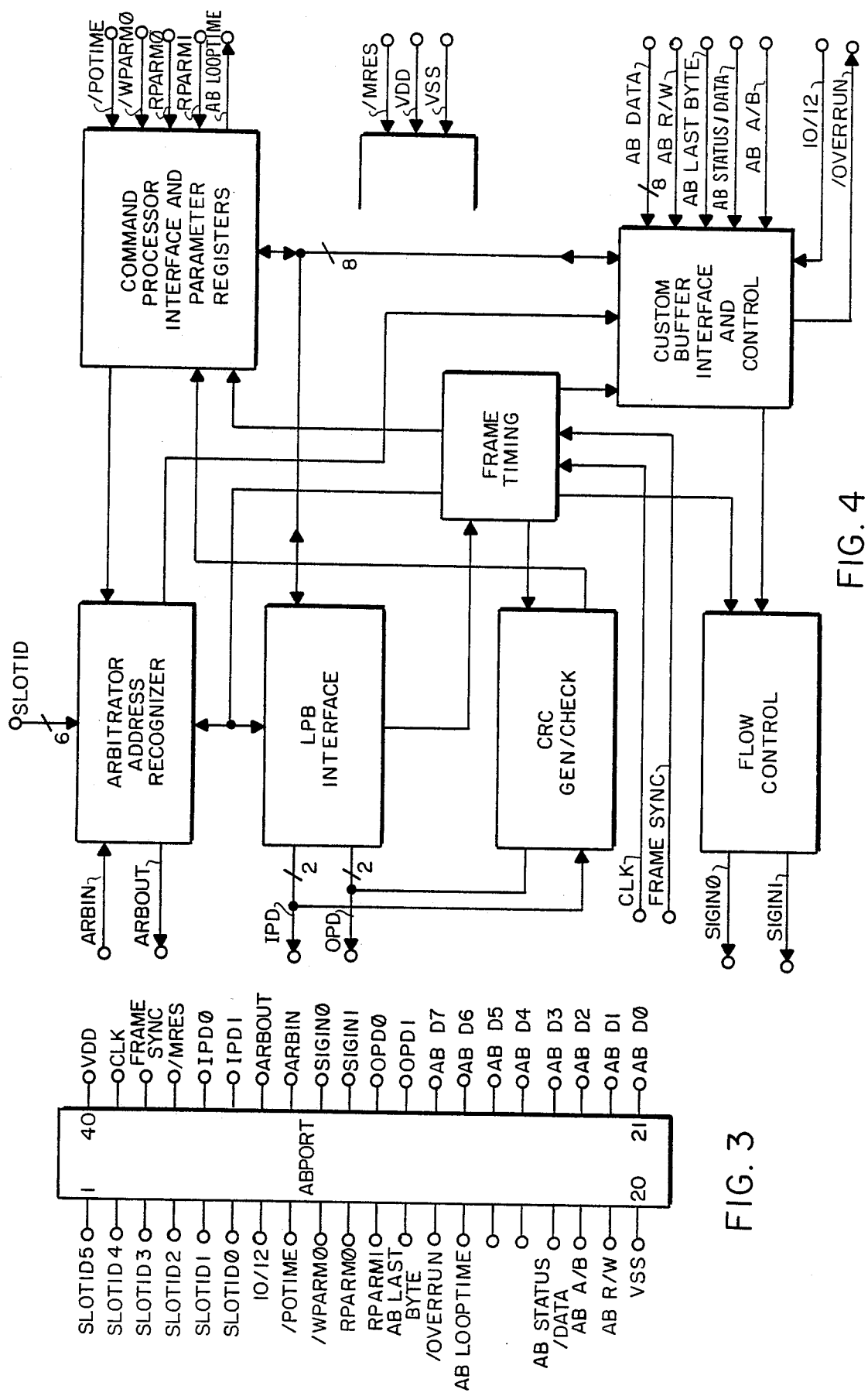

PACKET BUS INTERFACE

CROSS REFERENCE TO RELATED APPLICATIONS

The following applications filed on even date herewith and assigned to the same assignee disclose aspects pertinent to the present application and are hereby incorporated as if fully disclosed herein:

Mini Packet Receiver Transmitter application Ser. No. 908,056 in the name of Holger Opderbeck, Gulay Sencer, William Carr and Steven Byars;

Synchronous Packet Manager application Ser. No. 908,112 in the name of William W. Finch and Gulay Sencer;

Asynchronous Packet Manager application Ser. No. 908,111 in the name of William W. Finch and Gulay Sencer; and Voice Packet Assembler Disassembler application Ser. No. 908,076 in the name of Gary Schlecte and John Csapo.

BACKGROUND OF THE INVENTION

The arbitrated Bus Interface (ABI) of the present invention implements Minipacket Transfer functions between users of the local packet bus. Packet switching is known but it is typically implemented by software controlled processors. Such an implementation limits the throughput of a system to the speed of the processor.

The (ABI) of the present invention, however, implements the actual switching in the (ABI) hardware and thus eliminates the actual switching.

SUMMARY OF THE INVENTION

In accordance with the present invention, an arbitrated bus interface circuit is provided for use in a system including a bus and an external processor. The arbitrated bus interface comprises an arbitrated bus port connected to the bus and operated to acknowledge receipt of data from the bus, and a receiver-transmitter port connected to the external processor and operable to interrupt the external processor.

Also included is a custom buffer circuit which is connected between the arbitrated bus port and the receiver-transmitter port and operated to store data received from and transmitted to the aribtrated bus port and the receiver-transmitter port. This buffer circuit is further operated to provide an interrupt enable signal in response to storing a predetermined amount of data. The receiver-transmitter port is operated in response to the interrupt enable signal to interrupt the external processor.

A command processor is further included and it is connected to the arbitrated bus port, the receiver-transmitter port and the custom buffer circuit. It is operated to arbitrate on the arbitrated bus interface circuits having buffers which have stored said predetermined amount of data.

DESCRIPTION OF THE DRAWING

FIG. 3 of the accompanying drawing is a pinout diagram of the AB Port of FIG. 1;

FIG. 4 of the accompanying drawing is a block diagram of the AB Port of FIG. 1;

DESCRIPTION OF THE PREFERRED EMBODIMENT

The (ABI) provides the interface to the LPB for a number of different packet line circuit.

Inbound Minipackets (MPs) arrive at the ABI under the control of the microprocessor. The ABI then requests use of the LPB using a distributed arbitration mechanism. When use is granted, the ABI transmits the MP over the LPB.

For administrative and diagnostic purposes, the ABI can loopback certain MPs (called command MPs) received from the LPB and return them to the LPB. The ABI can also loopback command MPs and return them to the microprocessor. The primary function of the Command Processor is to control loopback command MP timing within the ABI.

Figure 1:
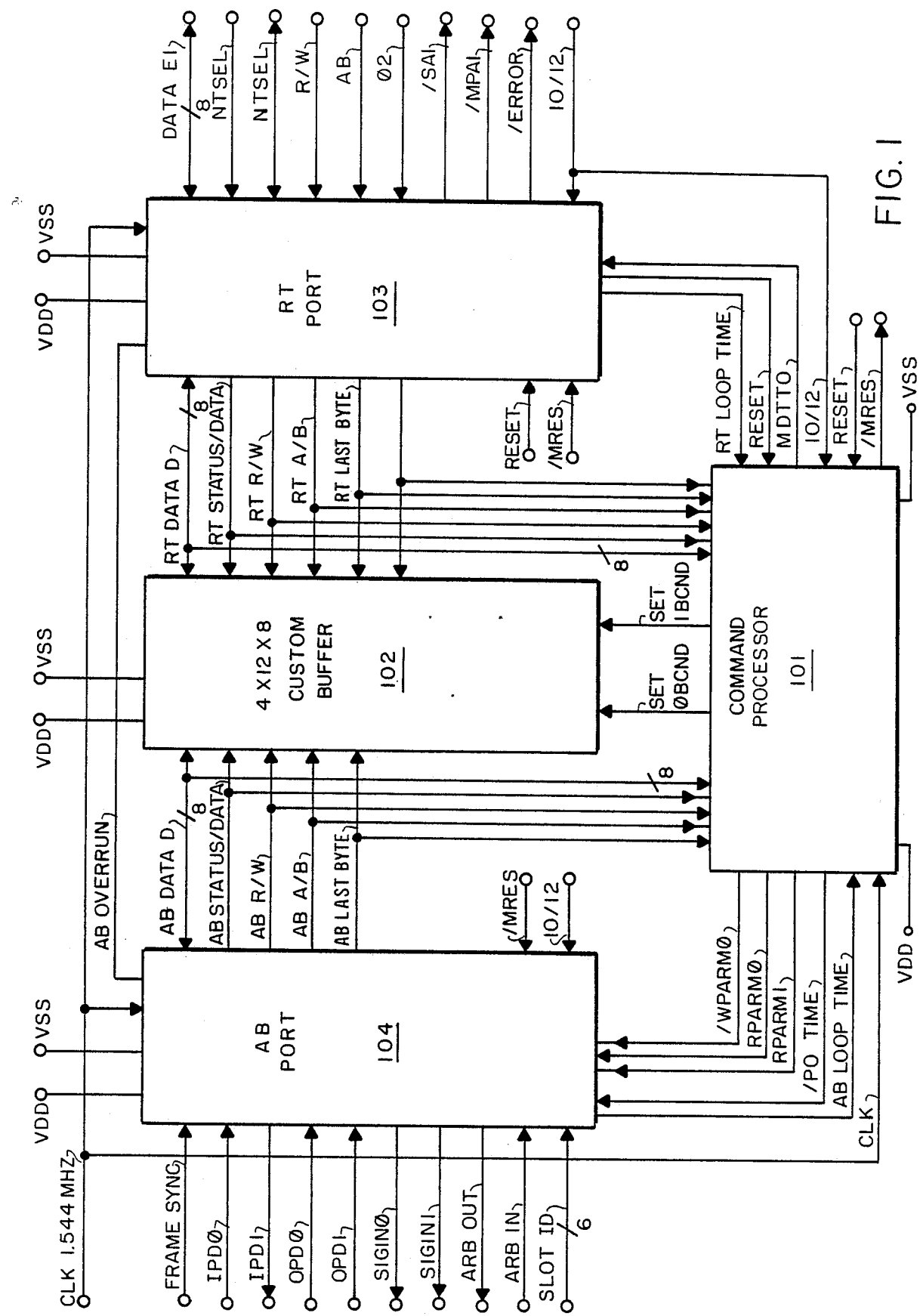
FIG. 1 of the accompanying drawing is a block diagram of the Arbitrated Bus Interface of the present invention.

Referring now to FIG. 1, a block diagram of the ABI Circuit is shown.

The Arbitrated Bus Interface Circuit (ABI) implements Minipacket Transfer functions between the users of the Local Packet Bus.

The ABI Circuit is the key to the entire system. It interfaces a microprocessor to the bi-serial arbitrated local packet bus. This is a complex process that normally would have required a large number of chips.

The ABI Circuit contains the arbitrated circuitry to that during a particular portion of the data transfer cycle a number of 'ABI chips all resolve the winner of the contention. By arbitrating on the bus only those chip sets with full buffers fight for bus usage. This gives a higher data band width than token passing buses where all chips (or ports) would be given a chance to use the bus whether they need it or not.

The ABI Circuit performs a host of other functions which can probably best be covered by looking at the chips independently.

The AB port can arbitrate on the bus, acknowledge receipt of packets and validate received and transmitted packets using its internal CRC circuit.

The custom buffer can store two full inbound and two full outbound minipackets. It is a memory. It also contains logic to signal when its buffers are full and an arbitration cycle is to be performed.

The receiver-transmitter port is the microprocessor interface. it can interrupt the uP when a buffer is full.

The command processor oversees the entire circuit. It controls bus contentions and such. The circuit has loopback capability to loop back minipackets from both the local packet bus and microprocessor ports. The command processor is key in controlling these special mini-packets.

The ABI circuit is novel for its level of integration and diagnostic capability. It is bandwidth efficient and contains all basic packet-switching "transfer" functions.

When referring to the direction of travel of a Mini-packet (MP), inbound means that the MP is moving from the microprocessor toward the LPB and outbound means that the MP is moving from the LPB toward the microprocessor.

When referring to the bits of a command MP, the following conventions are defined by the Mini-Packet Protocol (MPP):

The T bit is bit 7 of byte o.
The M bit id bit 6 of byte o.
The Security bit is bit 7 of byte 2 (the third byte).
"F8" refers to a hex value of F8 in byte 4.
The Command/Response bit is the bit 7 of byte 5.
The Local/Remote bit is bit 3 of byte 5.
The Interrogate/Initialized bit is bit of byte 5.
Byte 6 contains the value written to or read from the Parameter Register o.
Byte 7 contains the value read from Parameter Register 1.

The Command Processor (CP)10 provide processing for command MPs. This processing entails detection of commands, initialization of certain controllable parameters, and interrogation of certain status parameters. Command MPs can be either local, or remote, coming off the LPB. An important feature of command MPs is that they are looped back to their source. Looped back MPs allow the integrity of the communications lines in the system to be verified.

The ABI can operate in either 10-byte mode or 12-byte mode. The LPB always operates in 12-byte mode. However, some packet devices operate in 12-byte mode and others in 10-byte mode. Therefore, the ABI provides format conversion for those packet devices operated in 10-byte mode. An ABI in 10-byte mode has been said to be preserver mode. Whether the ABI is operating in 10 byte mode or 12-byte mode affects the detection of command MPS by the CP.

The ABI can operate in two MP format modes, In 10-byte mode, the ABI converts between the LPB 13-byte MP format and the 10-byte MP format. The conversion process involves deleting the TO-ID field for outbound Mps and inserting the FROM-ID field for inbound MPs. In 12-byte mode, the ABI converts between the LPB 13-byte format and the 12-byte format used by a privileged processor. Conversion involves adding a cyclical redundant check (CRC) byte for inbound MPs and checking and deleting a CRC byte for outbound MPs. Whether the ABI is operating in 10-byte mode or 12-byte mode affects the detection of command MPs. this mode can be interrogated by a command MP.

The ABI can operate in a single-line or multi-line addressing mode. ID ABI maintains a 3-bit parameter called MSK (Mask) which controls the addressing mode. Each ABI checks every outbound MP's TO-ID field to see if the MP is destined for one of its packet devices. The range of acceptable TO-IDs is determined by using the SLOT-ID as a base address and the MSK to calculate the range above the base address. If MSK represents an integer, m, between 0-7 then the range is calculated as 2**m. In single line mode, the MSK should be set to binary 000. The ABI then accepts only those MPs whose RO-ID field match its SLOT-ID. SLOT-ID is a bit value obtained from ABI input pins.

For any value of MSK other than 000, the 'ABI operates in multi-line mode. In multi-line mode, the ABI accepts multiple TO-ID addresses. If MSK is equal to 100, then m is equal to 4, and the desired range is 16. Actually, a value of 4 for m means that the 4 least significant bits of the SLOT ID are forced to match the 4 least significant bits ID the TO-ID. Therefore, please note that the desired range of 16 addresses is not necessarily the 16 addresses consecutively above the base address. For the desired addresses to occupy the range directly above the base address, the least significant bits of the SLOT ID that are masked off must be configured to be zeroes.

The MSK parameter is held in an internal ABI register and is initialized by a command MP.

For administrative and diagnostic purposes, the ABI loops back command MPs. Command MPs can be either local or remote. Local command MPs can be either local or remote. Local command MPs come from the microprocessor side and appear in the Buffer chip 102 as inbound MPs. At the same time as the RTPORT 103 signals the Buffer chip to make the buffer full, the CP signals the Buffer chip to mark it as a command. The ABPORT 104 sees the command flag, and instead of transmitting the MP over the LPB, loops it back into an outbound buffer. The RTPORT then returns it to the microprocessor.

Remote command MPs come off of the LPB and appear in the Buffer chip as outbound MPs. When the ABPORT signals the Buffer chip to mark the buffer full, the CP signals the Buffer chip to mark it as a command. When the RTPORT sees the command flag, instead of signalling the microprocessor that a MP is available it loops the MP back into an outbound buffer. While doing so, the RTPORT moves the data in the FROM-ID field to the TO-ID field. This allows the command MP to return to its originator. The ABPORT then performs arbitration and transmits the MP back to the Packet Router.

Figure 2:
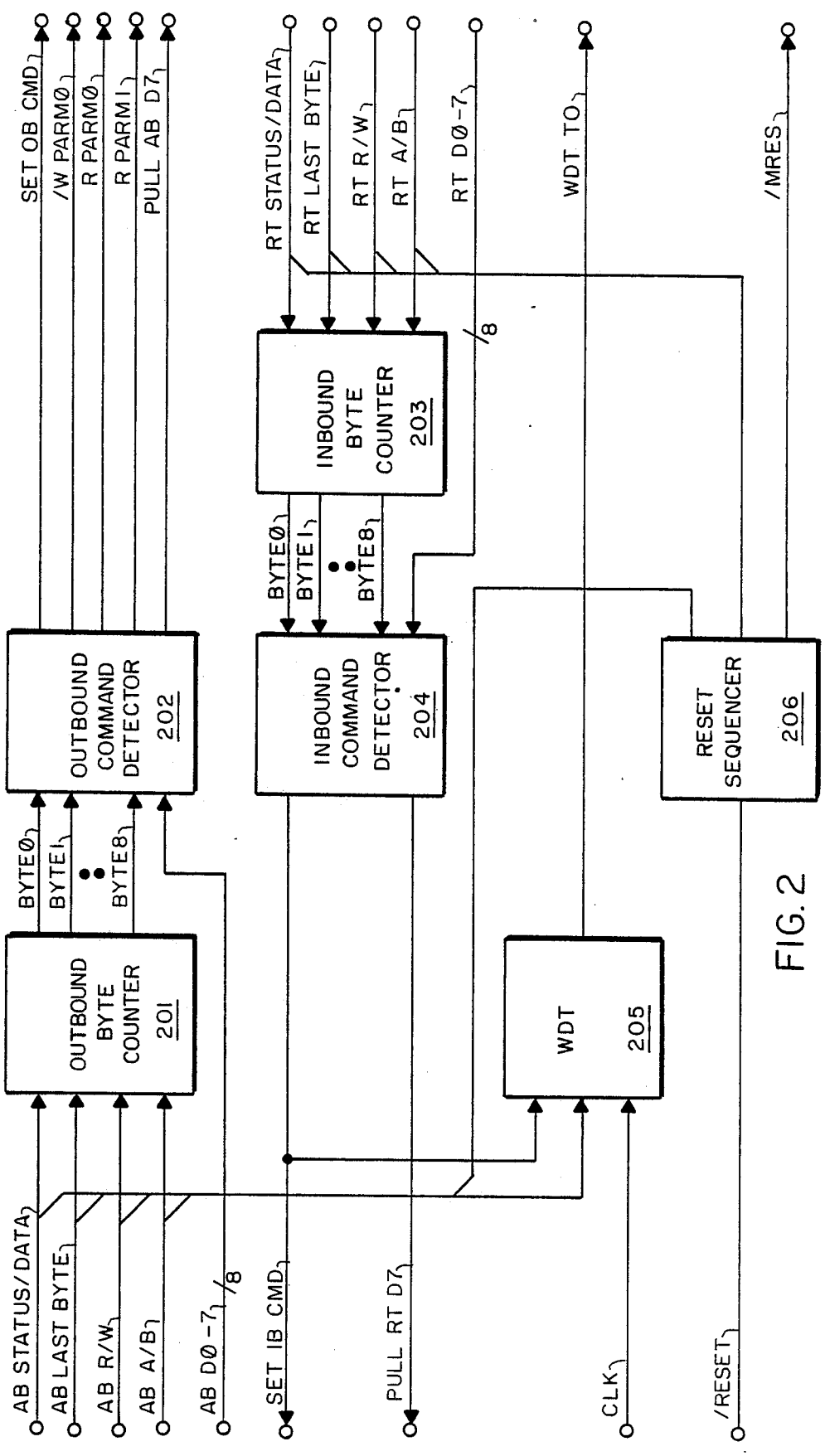
FIG. 2 of the accompanying drawing is a block diagram of the Command Processor of FIG. 1.

Referring to FIG. 2 a block diagram of the CP. is shown. The CP consists basically of Outbound Byte Counter 201, Outbound Command Detector 202, Inbound Byte Counter 203, Inbound Command Detector 204, Watch Dog Timer (WDT), and Reset Sequencer 206.

The CP Reset Sequencer is responsible for resetting all of the ICs which comprise the ABI after a power-up, software reset, or error condition has been detected. At the heart of this "restarting" is the clearing of the Buffer Chip. The buffer chip has no reset pin; therefore the CP must force it to look empty by reading the "last byte" from each of the 4 buffers.

The RTPORT detects when a reset is necessary and sends a RESET command to the CP. As long as RESET is true, the CP asserts MRES (Master Reset) to the ABPORT and the RTPORT. As long as MRES is asserted, the ABPORT puts its drivers for AB STATUSDATA, AB R/W, AB A/B, AND AB LAST BYTE in a high-impedance state. Likewise, the RTPORT puts its drivers for RT STATUS/DATA RT STATUS/DATA, RT R/W, RT A/B, and RT LAST BYTE in a high-impedance state. The CP takes control of these signals.

When the RESET command is removed, the RESET Sequencer counts off six cycles of CLK and on the seventh cycle removes the MRES command. During those six CLK cycles, the CP manipulates the Buffer Interface signals to clear the Buffer. To do this, it holds AB LAST BYTE and RT LAST BYTE true, and holds AB R/w and RT R/w in the read position. It points AB A/B and RT A/B to the A buffers of Buffer 102 (FIG. 1) then takes Ab STATUS/DATA and RT STATUS/-DATA low first, and then high. This reads the "last byte" out of the two A buffers. Then the CP points AB and RT A/b to the two B buffers of Buffer 102 (FIG. 1) and takes AB STATUS/DATA and RT STATUS/-DATA low and then high again. This clears the two B buffers.

As soon as MRES is taken away, the WDT begins counting CLK cycles. It will assert WDTTO (Watch Dog Timer Time Out) if it is not "tickled" within 1.6M CLK cycles. WDTTO stays true for one CLK cycle and does not cause a MRES unless the CP is hooked up correctly with an RTPORT. The wdt is "TICKLED" WHENEVER THE LAST BYTE OF AN MP IS WRITTEN INTO THE bUFFER FROM THE AB SIDE OR WHENEVER set IB CMD OCCURS.

The Inbound Byte Counter is a twisted ring (Johnson) counter which is incremented on the rising edge of RT STATUS/DATA if RT R/W is in write mode. It is cleared during RT LAST BYTE (read or write). The counter outputs are decoded to specify the byte number as needed.

The Inbound Command Detector looks for command sequences in the MP data and takes the appropriate action. The Inbound Byte Counter's decodes are compared against the appropriate bits of RTDO-RTD7. If a particular byte of data satisfies a command requirement, a JK flip-flop is set for that requirement.

During Byte 5 (the sixth byte), While RT STATUS-DATA is low, if RT LOOPTIME is true, the CP pulls RTDL (Which is open-drain on the RTPORT) low. This fulfills resetting the Command Response bit while the RTPORT is performing a loopback operation.

During RT LAST BYTE, SET IB CMD is asserted if the following conditions are met:
*F8 is detected
*Command/Response bit is set
*LOOPTIME is not true
*(10/12 is in 10-byte mode+10/12 is in 12-byte mode* Local/Remote is set).

After the last byte is written, the JK flip-flops are all reset.

Similarly, the Outbound Byte Counter is a twisted ring(Johnson) counter which is incremented on the rising edge of AB STATUS/DATA if AB R/w is in the write mode. It is cleared during AB LAST BYTE (read or write). The counter outputs are decoded to specify the byte numbers as needed.

The Outbound Command Detector looks for command sequences in the MP data and takes the appropriate action. The Outbound byte Counter's decodes are compared against the appropriate bits of AB DO-AB D7. If a particular byte of data satisfied a command requirement, a JK flip-flop is set for that requirement. During Byte 5, while AB STATUS/DATA is low, if AB LOOPTIME is true, the CP pulls AB D7 (which is open drain on the ABPORT) low. This fulfills resetting the Command/Response bit while the ABPORT is performing a loopback operation.

During the Byte 6, R PARM O is asserted if the following conditions are Met:
*Interrogate/Initialized is set
*AB LOOPTIME is true+Local/Remote is reset
*Command/Response is set
*F8 is detected
*The Security bit is set
*TM=oo.

During Byte 6, PO TIME is always asserted.
During Byte 7, R PARM 1 is asserted if:
*AB LOOPTIME is true+Local/Remote is reset
*Command/Response is set
*F8 is detected
*The Security bit is set
*TM=00.

During AB LAST BYTE, SET OB CMD is asserted if:
*TM=oo
*The Security bit is set
*F8 is detected
*Command/Response is set
*Local/Remote is reset.

During AB LAST BYTE, W PARMA o is asserted if:
*Set OB CMD is asserted
*Interrogated/Initialized is reset.

The CP pinouts are defined as follows:

| PINOUTS FOR COMMAND PROCESSOR GATE ARRAY | | | | | |
|---|---|---|---|---|---|
| 1 | 1 | RESET | 40 | | VDD |
| 2 | 1 | CLK | 39 | i/o | RT D0 |
| 3 | 0 | WDTTO | 38 | i/o | RT D1 |
| 4 | I | /TEST | 37 | i/o | RT D2 |
| 5 | i | RT LOOPTIME | 36 | i/o | RT D3 |
| 6 | o | R PARM 1 | 35 | i/o | RT D4 |
| 7 | o | R PARM o | 34 | i/o | RT D5 |
| 8 | o | /W PARM o | 33 | i/o | RT D6 |
| 9 | o | /PO TIME | 32 | i/o | RT D7 |
| 10 | o | /MRES | 31 | o | SET 1B CMD |
| 11 | i | AB LOOPTIME | 30 | I | 10/12 |
| 12 | o | SET OB CMD | 29 | i/o | RT LAST BYTE |
| 13 | i/o | AB D0 | 28 | i/o | RT A/B |
| 14 | i/o | AB D1 | 27 | i/o | RT R/W |
| 15 | i/o | AB D2 | 26 | i/o | RT STATUS/DATA |
| 16 | i/o | AB D3 | 25 | i/o | AB LAST BYTE |
| 17 | i/o | AB D4 | 24 | i/o | AB /A/B |
| 18 | i/o | AB D5 | 23 | i/o | AB R/W |
| 19 | i/o | AB D6 | 22 | i/o | AB STATUS/DATA |
| 20 | | VSS | 21 | i/o | AB D7 |

I- Primary input to ABI chip set.
o- Primary output form the ABI chip set.
i- Input to this IC from another member of the ABI set.
o- Output from this IC to another member of the ABI set.

The CP signals associated with the above identified pins are defined below:
/Reset (input)
Input from the RTPORT instructing the CP to assert /mres. The RTPORT holds /RESET low in response to a POC input, a Software Reset Command from the microprocessor, or a WDTTO. THE CP holds /MRES low as long as /reset is true. When /RESET goes high, /MRES stays low for 6 cycles of CLK, allowing the Custom Buffer to be cleared. This is a Schmitt trigger input.

WDTTO (output)

Out put to the RTPORT Indicating that the Watch Dog Timer has experienced a Time Out. Receipt of this signal causes the RTPORT to assert/RESET. The Watch Dog Timer is started when /MRES goes high. A WDTTO occurs after 1,570,000 cycles of CLK if an outbound MP or a local command MP is not detect.

RT LOOPTIME (input)

This lead is high for one packet TIME, while the RTPORT is reported performing a Loop back operation—reading a MP from an outbound buffer and writing it back into an inbound buffer.

AB PORT INTERFACE

RPARM1 (output)

This lead is used during command MPs to instruct the ABPORT to Read PARameter 1. When this lead is high, the ABPORT writes the information contained in its Parameter Register 1 into the Custom Buffer.

RPARMO (output)

This lead is used during command MPs to instruct the ABPORT to Read PARameter o. When this lead is high, the ABPORT writes the information contained in its Parameter Register o into the buffer.

WPARMO (output)

This lead is used during command MPs to instruct the ABPORT to WRITE PARaMeter o. When this lead is low, the ABPORT transfers the data that was saved at /PO TIME into Parameter Register o.

/PO TIME (output)

Timing signal used to instruct the ABPORT to latch a byte of data into a temporary holding register.

AB LOOPTIME (input)

This lead is high for one MP frame TIME if the AB-PORT is performing a LOOP Back operation—reading a MP from an inbound buffer and writing it back into an outbound buffer.

BUFFER INTERFACE

Set OB CMD (output)

High true signal used to indicate that a particular buffer contains a command MP. If this signal is true while AB STATUS/DATA is low, then the Outbound Buffer Command flag is SET for the particular buffer (A or B) being written.

AB DO-AB D7 (input)

These 8 leads comprise the Data bus between the ABPORT and the Custom Buffer. The Command Processor monitors data being written into the Buffer to determine if a command MP is being put in a buffer. If a command MP is detected, the SET OB CMD signal is asserted.

AB STATUS/DATA (input/output)

When /MRES is true, the Command Processor uses this signal to clear the Buffer (by reading the last byte from the A and B buffers). When /MRES is not asserted, the ABPORT controls this signal and the Command Processor monitors it along with AB DO-AB D7 to detect command MPs.

AB R/W (/INPUT/OUTPUT)

When /MRES is true, the Command Processor uses this singal to clear the Buffer Chip. When /MRES is not asserted, the ABPORT controls this signal and the Command Processor monitors it along with AB DO-AB D7 to detect command MPs being written into the Buffer.

AB A/B (input/output)

When MRES is true, the Command Processor uses this signal to clear the Buffer Chip. When /MRES is not asserted, the ABPORT controls this signal.

AB LAST BYTE (input/output)

When /MRES is true, the Command Processor uses this signal to clear the buffer. When /MRES is not asserted, the ABPORT controls this signal and the Command Processor monitors it along with AB DO-AB D7 to detect command MPs.

RT STATUS/DATA (input/output)

When /MRES is true, the Command Processor uses this signal to clear the Buffer Chip (by reading the last byte from the A and B buffers). When /MRES is not asserted, the RTPORT controls this signal and the Command Processor monitors it along with RT DO-RT D7 to detect command MPs.

RT/R/W (input/output)

When /MRES is true, the Command Processor uses this signal to clear the Buffer Chip. When /MRES is not asserted, the RTPORT controls this signal and the Command Processor monitors it along with RT DO-RT D7 to detect command MPs being written into the Buffer Chip.

RT A/B (input/output)

When /MRES is true, the Command Processor uses this signal to clear the Buffer chip. When /MRES is not asserted, the RTPORT controls this signal.

RT LAST BYTE (input/output)

When /MRES is true, the Command Processor uses this signal to clear the Buffer Chip. When /MRES is not asserted, the RTPORT controls this signal and the Command Processor monitors it along with RT DO-RT D7 to detect command MPs.

SET IB CMD (output)

High true signal used to indicate that a particular buffer contains a command MP. If this signal is true while RT STATUS/DATA is low, then the Inbound Command Flag is SET for the particular buffer (A or B) being written.

RT DO-RT D7 (input)

These eight leads comprise the Data bus between the RTPORT and the Custom Buffer. The Command Processor monitors data being written into the Buffer Chip to determine if a command MP is being put in a buffer. If a command MP is detected, the SET IB CMD signal is asserted. MISCELLANEOUS:

CLK (input)

1.5 44 MHz square wave clock signal from the LPB. In the command processor, CLK is used as a time base for the Watch Dog Timer. A time out occurs after 1,580,000 cycles of CLK if an outbound MP or a local command MP is not detected.

/TEST (input)

Low true signal used during manufacturing for TESTing. During normal operations, this input must be enabled high. When /TEST low, the 21-bit watchdog counter is truncated to the least significant 10-bits (to facilitate manufacturing test) to a shortened count of 768 clock (CLK) periods. Count out in this test mode enables the RPARMI pin. With /TEST low the high order 11-bits of the watchdog are tested by observing that WDTTO goes high after a delay of 2048 clock (CLK) periods. This is a Schmitt trigger input with hysteresis.

/MRES (output)

This is the master RESet signal to ABPORT and RTPORT. /MRES is asserted during the entire time /RESET is asserted by the RT port. When /RESET goes high, /MRES stays low for 6 additional cycles of CLK, allowing the Command Processor to clear the Buffer.

10/12 (input)

This lead informs the Command Processor whether it is operating in a 10-byte mode (high) or 12-byte mode (low). This mode of operation is used in the determination of whether or not a MP is a command MP.

The Arbitrated Bus Port (ABPORT) is the physical line through which a line card can interface to Local Packet Bus (LPB) to transfer minipackets. The ABPORT provides the interface between the LPB and the ABI and is responsible for Address Recognition, Bus Arbitration, Flow Control and CRC Generation and Checking associated with the LPB. The ABPORT also generates the handshaking signals to transfer bytes between the ABPORT and Custom Buffer of the ABI Chip Set. The Pinout Diagram for the ABpORT is shown in FIG. 3. Also, the signals identified in that figure are described in Table I.

The ABPORT is the interface to the Local Packet Bus (LPB) and must be able to arbitrate for the LPB to send inbound packets (from ABPORT to LPB) and be able to receive outbound packets by address recognition. Also, since the ABPORT has no buffer for a Mini-Packet (MP), it must control the handshaking signals between the Custom Buffer IC (where the MP is stored).

Referring now to FIG. 4, a block diagram of the ABPORT is shown. The centralcontrol sequencer of the ABPORT is the FRAME TIMER. It is a 64 state counter which is synchronized from the Frame Sync signal. Many control signals are decoded from this counter and routed to other blocks of the ABPORT (see FIG. 3 timing format).

Arbitration The ABPORT uses its SLOTS ID, which is pin programmable, to implement a rotating priority arbitration mechanism for use of the LPB. The arbitration process consists of transmitting the SLOT ID over a shared, open collector output pin ARB OUT, Each ABPORT then monitors this shared output (thru ARB IN) and discontinues arbitration if any bit is not equal to its own transmission. This says if that the SLOT ID was not echoed, that an ABPORT with a higher SLOT ID has requested service (because the ARB OUT is true low). If the SLOT ID is echoed, then the arbitration was successful and the ABPORT is granted use of the LPB during the next frame to send the inbound MP that is waiting in the Custom Buffer IC.

```
Time Slot 62 63 0 1 2 3 4 5 6 7 8 9 10 11 12 13 14 15
16 17 18 ***
Frame sync
Clock
PD0   APB B0 B2 B4 B6 *b8 B18 B12 B14 B16 B18 B29 B22
B24 B26 B38 B32 ***
             Byte 0   Byte 1   Byte 2   Byte 3
PD1   LSH  B1 b3 B5 B7 B9 B11 B13 B15 B17 B19 B21 B23
B25 B27 B31 B33 ***
ARB Out  TRO0 Tro1 Slot 105 Slot 104 Slot 103 Slot 102
Slot 101 Slot 100
```

FIG. 3 ABPORT TIMING FORMAT

Address Recognition. The ABPORT receives all MP's transmitted to all 64 packet devices on the LPB, so it must recongnized the TO-ID field of the MP and accept only those MP's destined for one its packet devices. The ABPORT can operate in a single-line or multi-line addressing mode. The ABPORT maintains a 3 bit parameter called MSK (Mask) which controls the addressing mode. The range of acceptable TO-ID's is determined by using the SLOT-ID input pins as a base address and MSK to calculate the range above the base address. If MSK represents an interger, M, between 0–7, then the range is calculated as 2** m. In single line mode, the MSK should be set to 000, and the ABPORT will only accept MP's whose TO-ID match its SLOTS-ID.

In multi-line mode, the ABPORT accepts multiple TO-ID addresses. If MSK is equal to 100, then m is equal to 4, and the desired range is 16. Actually a value of 4 for m means that the 4 least significant bits of the SLOT ID are forced to match with the 4 least significant bits of the TO-ID. Therefore, the desired range of 16 addresses is not necessarily the 16 addresses consecutively above the base address (unless the least significant bits of the SLOT-ID that are to be masked off, are set to zeroes).

The MSK parameter is held in an Internal ABPORT register and is changed by a MP command. The TO-ID field is contained in Byte 1 of the MP.

Flow Control. Flow control allows the ABI to limit its outbound buffering to 2 MPs while assuring to MP loss to buffer overrun. Flow control is implemented by using two Time Division Multiplexed (TDM) signalling output pins. Each ABPORT is assigned one or more fixed time slots on each pin for the purpose of communicating signalling (flow control) to the Packet Router. The first signalling pin (SIGNO) is used to communicate that the ABI is busy, so that the Packet Router does not attempt to send another MP to that ABPORT. The ABI is defined as busy if no outbound buffer is empty or if the ABI is performing a loopback. When the ABI is busy, it asserts the busy signal during all of the time slots which correspond to the whole range of addresses for that ABPORT's packet devices.

The second signalling output pin (SIGN) is used to communicate that a packet has been transferred by that ABPORT during the previous LPB frame time. The packet transfer signal is asserted for both inbound and outbound MPs. Packet ransfer is asserted only for the time slot which corresponds to the base address of the ABPORT.

LPB INTERFACE. Serial data OPDO and OPD1 is clocked into the VO shift register upon the detection of Frame Sync and after each byte of data has accumulated in the shift register, it is transferred into the latch to be written into the Custom Buffer Chip. At the start of each frame. Two pieces of information, called ARB and LSN are transmitted over the OPD lines to define the type of transfer to occur, inbound or outbound. The Packet Router controls ARB and LSN and thus dictates the alternation between inbound and outbound cycles. This information is passed to the Frame Timer controller to produce the needed signals for inbound or outbound frames and is decoded as follows:

| ARB | LSN | FUNCTION |
|---|---|---|
| 0 | 1 | Arbitrate, Don't Listen - Outbound Fill Frame |
| 0 | 0 | Arbitrate, Listen - Outbound Packet Frame |
| 1 | 0 | Don't Arbitrate - Illegal State |

The TO-ID of the MP is passed to Address Recognizer to check if this MP is destined to one of this AB-PORT's packet devices. The CRC byte is not passed on to the Custom Buffer Chip. When granted use of the LPB, the ABPORT will transmit the MP being held in the Custom Buffer, to the Packet Router thru output pins IPDO and IPD1. If the ABPORT is operating in 10 Byte mode the FROM-ID (SLOT ID) must be placed into the I/O shift register instead of data from the Custom Buffer chip during the Stuff Slot ID signal from the Frame Timer. The CRC byte is appended to the inbound MP.

CRC Generation and Checking the LPB features CRC protection. This means the ABPORT must provide CRC generation for the inbound MP and CRC checking for the outbound MP. The ABPORT keeps a count of CRC violations up to a limit of 15. An outbound MP with a CRC violation is discarded.

Custom Buffer Interface. The Custom Buffer interface controls the handshaking signals to transfer MPs between the ABPORT and the Custom BUFFER Chip. The ABPORT monitors the status of the inbound and outbound buffers of the Custom Buffer Chip thru the data bus AB DO-AB D7 whenthe AB STATUS/DATA pin is high. From this information the AB-PORT can determine if an outbound buffer is available or there is a MP available in the inbound buffer and should arbitrate for the LPB.

If an outbound buffer is available in the Custom Buffer, then the ABPORT writes the MP into the buffer during the outbound packet frame. The conrol signal encoder uses the signals AB STATUS/DATA, AB R/W and AB A/B to write the MP to the appropriate buffer. The control signal encoder takes the AB STATUS/DATA low, puts the data byte on the AB DO-AB D7 pins, then brings the AB STATUS/DATA back high. The data byte is clocked into the Custom Buffer on the rising edge of AB STATUS/DATA. The ABPORT signals the Custom Buffer Chip to mark that buffer full by setting the AB LAST BYTE signal high during the 12th write to the custom Buffer. If the MP's TO-ID is unacceptable or a bad CRC is detected, the ABPORT does not signal the Custom Buffer Chip to make that buffer full (AB LAST BYTE stays low) and that buffer remains available for another outbound MP. If both outbound buffers in the Custom Buffer had been full and another outbound MP with valid address and CRC was received, then the OVERRUN—output pin would go low to indicate that a MP had been lost.

The inbound buffer status decoder monitors the Custom Buffer Chip and if INAFULL is true without INACMD, or if INBFULL is true without INBCMD, the arbitrator is signalled to arbitrate for the LPB. The Arbitrator takes ARBOURT high during TRQO and TRQ1 and then transmit its SLOT ID, most significant bit first. The Arbitrator compares what it receives back on ARBIN with what it sends out on ARBOUT. If there is a mismatch, the Arbitration is stopped and started over again on the next arbitration cycle. If the mismatch occurs while the SLOT ID is being transmitted then it is because an ABI with a higher SLOT ID has won the arbitration. If the Arbitrator matches all the way through SLOT IDO time, IBGRT (InBound GRant) occurs. Once IBGRT occurs, the Arbitrator will not take TRQO high even if a second inbound buffer is full and arbitrates again. In this way, if another ABI that has not won on this arbitration cycle takes TRQO high, then those ABI's that have won will have a mismatch during the TROQO time and keeps the priority rotating. But if only ABI's that have won continue to arbitrate, then this avoids wasting a frame. When granted use of the LPB, the ABPORT transmits the MP to the Packet Router.

During an inbound packet frame, the control signal encoder uses the signals AB R/W, AB A/B and AB STATUS/DATA to read the appropriate inbound buffer. The control signal encoder takes AB STATUS/DATA low, reads the data byte on /a/b/ DO-AB D7, then brings AB STATUS/DATA back high. The rising edge of AB STATUS/DATA clocks the shift registers in the Custom Buffer Chip in preparation for reading the next byte of data. The ABPORT signals the Custom Buffer Chip that the buffer is empty by setting the AB LAST BYTE signal high during the 12th read cycle.

Local command MP's can be looped back during inbound frame times (provided that the IBGRT has not occured) or during outbound fill FRAMES. The AB-PORT sees the command flag of the Custom Buffer Chip and instead of transmitting the MP over the LPB, loops it back into an outbound buffer. A data byte is read from an inbound buffer and then looped back at the Buffer Interface and written to an outbound buffer.

Remote command MPs come off the LPB and appear in the Custom Buffer Chip as an outbond MP. When the AB Port signals the Custom Buffer Chip to mark that buffer full, the Command Processor Chip (CP) signals the Custom Buffer Chip to mark that buffer as a command. The RT PORT Chip sees the command flag and instead of signalling the microprocessor that a MP is available, loops the MP back into an inbound buffer of the Custom Buffer Chip. The ABPORT then peforms arbitration and transmit the MP back to the Packet Router.

Command Processor Interface. The internal AB-PORT registers can be written or read by control signals coming from the Command Processor Chip (CP). During every outbound frame, the POTIME—Input singal sent from the CP to Clock byte 6 of the MP into a temporary register. At the end of the MP if it is determined to be a valid command MP, WPARMO-input signal from the CP clocks the data from the temporary register into Parameter Register O.

During command MPs (from the inbound buffer of the Custom Buffer Chip), the CP sends RPARMO or RPARM1 during Byte 7. This dumps the contents of Parameter Register 0 or 1 onto the internal data bus, where it is looped back to the outbound buffer of the Custom Buffer Chip.

Parameter Registers. On the ABPORT, there exists 2 Parameter Registers that are accessed by command MPs. The first register is Parameter o, which is an 8 bit read/write register. It is written to by remote initialize command MPs; it is read by remote interogate and local interogate command MPs. The following bits are defined for Parameter Register O:

B7—Don't Care for writes; undetermined for reads.

B6—Force Bad CRC (Read/Write). If this bit is set, the inbound MP will have a bad CRC (CRC inverted). The next Inbound MP which is to have the bad CRC, is usually the command MP which set this bit as it gets looped back in response. However, under heavy traffic conditions, a MP with user data may be tagged with the bad CRC and lost. This bit is used only to check the Packet Router's detection of CRC errors. This bit is reset when the ABPORT reset.

B5—Colcated (read only). This bit (when set) indicates that the ABI is operating as a slave attached to a microprocessor. This is the only mode implemented in this version of the ABI; consequently this bit is always equal to 1.

B3—Don't Care for writes; Undertermined on reads.
B2—PLA Bit Mask 4 (read/write)
B1—PLA Bit Mask 2 (red/write)
B0—PLA Bit Mask 1 (read/write)

These 3 bits instruct the ABPORT as to many bits are "dont care" when examining the TO-ID field of outbound MPs. When the ABPORT is reset, these bits will be rest to o. These 3 bits represent an Integer M between 0-7' the endoing of M is as follows: M-0, recognized 1 TO-ID as indicated by SLOT ID M-1, recognized 2 TO-IDs INDICATED BY THE 5 MOST SIGNIFICANT BITS OF SLOT-ID.

M-2, recognized 4 TO-IDs as indicated by the 4 most significant bits of SLOT ID.

M-3, recognized 8 TO-IDs as indicated by the 3 most significant bits of SLOTS ID.

M-4, recognized 16 TO-IDs as indicated by the 2 most significant bits of SLOT ID.

M-5, recognize 32 TO-IDs as indicated by the most significant bit of SLOT ID.

M-6, recognized all 64 TO-IDs.
M-7, recognized all 64 TO-IDs.

Parameter Register 1 is a 8 bit read only register. It is read by any type of ABI command MP. In additon, it is cleared after being read by a remote command MP. This register powers up in an unknown state and is not cleared when the ABPORT is reset. The following bits are defined for Parameter Register 1:

B7—Undetermined
B6—Undetermined
B5—Undetermined
B4—Undetermined
B3—LPB CRC Error Count 8 (read Only)
B2—LPB CRC Error Count 4 (read only)
B1—LPB CRC Error Count 2 (read only)
B0—LPB CRC Error Count 1 (read only)

This is a count of how many CRC errors have occured on the LPB (destined for the TO-ID) since the last remote command MP. This count freezes at a value of 15; it does not rollover.

TABLE 1

Pin Name

These Signals contain the Binary Coded SLOT Identification number which is the ABI's address.

This Input informs the ABPORT whether it is operate in 10-byte mode (high) or 12-byte mode (low). The state of this pin is found by reading bit 4 of Parameter Register 0. This input is used as a timing signal to Instruct the ABPORT to latch a byte of data into a temporary register. This input pin is used during command MiniPAckets to Instruct the ABPORT to Write PARaMeter register o. When this pin is low, the ABPORT transfers that data that was saved by PO TIME—Into Parameter REGISTER O. This Input is used during command MiniPackets to instruct the ABPORT to Read PARaMeter O. When this pin is high, the ABPORT writes the information contained in its Parameter Register O into the Custom Buffer. The input is used during command MiniPackets to instruct the ABPORT to Read PARaMeter 1. When this lead is high, the ABPORT writes the information contained in its Parameter Register 1 into the Custom Buffer. This output pin uses a true high signal to indicate that this is the LAST BYTE in the transfer of a MiniPacket (MP) to or from the Custom Buffer. When this signal is high during a rising edge of AB STATUS/DATA, then (1) if AB R/W is low, then the Outbound Buffer Full Flag is set for the particular buffer (A or B) being written to, or (2) AB R/w is high, then the inbound Buffer Full Flag is reset for the particular buffer being read. This lead is in a high impedance state when MRES—is low. This output pin goes low if a MP with a valid address and CRC is received on the LPB and both outbound buffers are full in the Custom Buffer. This output pin is high for one MP frame TIME if the ABPORT is performing a loopback operation (ie reading a MP from an inbound buffer and writing it back into an outbound buffer).

This output pin controls the direction of the data buss between the ABPORT and the Custom Buffer IC. When this pin is high, the Custom Buffer drives the Data Bus with Status information. When low, the data bus contains valid Data information, if AB R/w is high, the data is driven onto the bus by the ABPORT. This pin is in a high impededance state when MRES—is low. This output pin is used to select either the A buffer (when high) or the B buffer (when low). This singal is used together with AB R/W to select one of the four buffers available in the Custom Buffer IC. This pin is in a high Impedance state when MRES—is low. This output pin is used to select either a Read operation or a Write operation. When this signal is high, then on the rising edge of AB STATUS/DATA, a read operation is performed from an inbound buffer. When low, a write operation is performed to an outbound buffer. This pin is in a high impedance state when MRES—is low. Ground.

These 8 pins comprise the Data bus between the ABPORT and the CUSTOM bUFFER. When AB statusDATA is low, the data bus contains one byte of data information. When AB STATUS/DATA is high, the data bus contains the status infromation: AB—DO—inbound Buffer A Full
AB-D3—Inbound
Buffer B Full
AB DS—Inbound
Buffer B Command
AB D6—Outbound
Buffer A Empty
Outbound Packet Data, 1 input pins.

Inbound SIGnalling output pins carrying active high status (busy and packet transfer) to the LPD. These pins are Time Dvision Multiplexed (TDM) betweenthe various ABI's on a given LPD. ARBitration INput pin. This input is used to monitor the ARB lead on the LPB to determine which ABI has won the right to transmit an inbound MP. ARBitration OUTput pin. The SLOT ID is output serially on this pin when arbitrating for use of the LPB. Inbound Packet data output pins. Thses pins carry active high MP data onto the LPB. Master RESet input pin. When this pin goes low, the MASK parameter is reset to 000. When MRES—is low. AB R/W, AB STATUS/DATA, AB A/B AND AB LAST BYTE are put in a high impedance state and all LPB Interface signals are disabled. When MREs—goes high, the AB-PORT waits for a frame sync, and then resumes operation. FRAME SYNC is an input pin with a pulse frequency of 24, 125 KHz, A high true pulse, 2 CLK cycles in length, synchronizes the ABI to the start of MP Frame time. The Clock input pin with a frequency of 1.544 MHz. +5 v supply.

Figure 5:
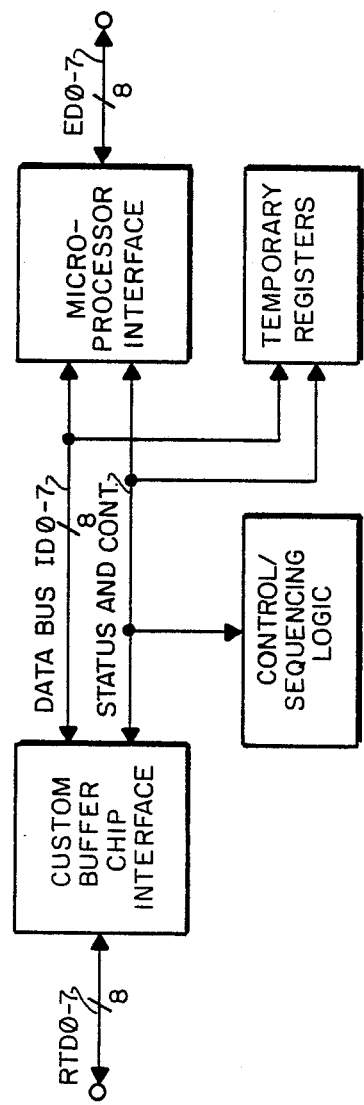
FIG. 5 of the accompanying drawing is a block diagram of the RT Port of FIG. 1.

Referring now to FIG. 5, a block diagram of the Receive Transmit Port (RTPORT) is shown. The ABI RTPort acts as the interface between the Custom Buffer Chip of the ABI chip set and the colocated 6502 microprocessor. The RT port passes Minipackets (MPs) between the microprocessor and the ABI Buffer Chip, and performs loopback on Command MPs in the Buffer Chip.

When not transferring an MP, the RT port is in an idle state, monitoring the Buffer status and waiting for either the outbound buffer to be filled or the microprocessor to send the Space Availabe interrupt Enable (SAIE) command bit. The RT port handles MP transfers according to the following rule of precedence: Command MPs first (assuming that an inbound buffer is available for loopback), next the Outbound MPs, then the Inbound data MPs. An outbound transfer is one from the Buffer chip to the microprocessor. An inbound transfer is from the microprocessor to the Buffer.

When at least one inbound buffer is empty and the SAIE bit is set, the RT port will wait for the microprocessor to begin transfer of an Inbound MP. As each byte is received from the microprocessor, it is transferred to the Buffer chip. The RT port will continue to wait for an inbound MP until either an inbound buffer is full or SAIE is reset to zero.

When an outbound buffer is full with a MP (and the RT port is not already waiting for an inbound MP), the RT port will assert the /MPAI interrupt to the microprocessor to begin transfer of the outbound MP. One byte at a time is ready from the buffer to the I/O Register in the Microprocessor Interface of the RT port. The /IO Register Full bit in the Status Register tells the microprocessor that the byte is ready to be read.

When an outbound buffer is full with a Command MP and an inbound buffer is empty (and the RT port is not already waiting for an inbound MP), the RT port will begin a Command Loopback. One byte at a time, the MP is read from the outbound buffer and written into the inbound buffer. The first and second bytes read are save in the RT port Temporary REgisters. The third and fourth bytes read are written out first and second, and the stored bytes are written out third and fourth. The rest of the MP is looped back in order.

The microprocessor interface consists of the I/O Register, the Status Register, and the Command Register. The microprocessor addresses the ABI as if the ABI were a pair of adjacent memory locations. The I/o Register must be assigned an even-numbered address; the Status and Command Register share the next consecutive odd-numbered address. The microprocessor system must use the upper 15 address bits to generate the /NTSEL chip select signal to the RT port. The low order address bit, AO, is a direct input to the RT port. The microprocessor must also supply its PHi-2 clock and R/W outputs to the RT port.

The I/O register is an 8-bit read-write register. Once Space Available is set in the Status register, an MP can be written one byte at a time into the RT port from the microprocessor. If mini-packet available is set an MP can be read one byte at a time. The length of the MP read or written depends on the state of the 10/12 Byte Mode pin.

The Status register provides the microprocessor with information about the status of the ABI. The bits of the Status register are defined when read as follows:

LAST BYTE indicates that the last byte of the MP been written to the I/O register for inbound MPs or the last byte of the MP has been read from the I/O register for outbound MPs.

I/O REGISTER FULL—for outbound MP's this bit indicates that the RT port is ready for the processor to read another byte of the MP. For inbound MPs when this bit is reset to zero, another byte may be written to the RT port.

ABI RESET indicates that the ABI is in the reset state.

MINIPACKET AVAILABLE indicates that there is an outbound MP ready for transfer to the mciroprocessor.

SPACE AVAILABLE indicates that a buffer is available for an inbound MP.

ABI OVERRUN ERROR indicates that the Packet Router sent MPs to the ABI even though the ABI AB port signaled that it was busy.

WDT TIME OUT indicates that the ABI has received either an outbound MP at least one second. Whenever a Watch-Dog Time Out occurs, the ABI will go into the reset state. This time out requires 1,570,000 CLK periods.

SPACE AVAILABLE INTERRUPT ENABLE indicates the setting of the Space Available Interrupt Enable bit inthe Control Register.

The RTPort Control Register allows the microprocessor to give certain specific commands to the ABI via the RT port with the command byte as follows:

|    | 67 Space |   |       |   |   |   |   | 60 |
|----|----------|---|-------|---|---|---|---|----|
| WR | AVIL     | X | SOFT WARE | X | X | X | X | X |
| ON |          |   |       |   |   |   |   |    |

INT ENA

SPACE AVAILABLE INTERRUPT ENABLE—If space is available for another MP and SAIF is set, /SAI interrupt to the microprocessor will occur until space is no longer available or SAIE is reset. When SAIE is set and space is available, the RT port will wait for inbound MPs from the microprocessor, ignoring outbound data and command MPs. Therefore, it is important that SAIE only be set when the microprocessor has an inbound MP ready to send.

SOFTWARE RESET—If this bit is reset to zero, the ABI will go into the reset state. Upon Power-Up, the ABI wll come up in reset. When the Software Reset bit is set to zero, the ABI will complete its reset procedure and after 6 clockcycles will be ready for operation.

The ABI Buffer Chip provides bidirectional double buffering for MPs passed between the ABPort and the RTPort. The RTPort writes to the inbound buffers and read from the outbond buffers.

During an inbound transfer the RT port chooses which buffer, A or B, it wishes to write into and sets the RT/AB pin appropriately. The RT R/w line is held low, and one byte of the MP is stored into the buffer on each rising edge of the RT STATUS/DATA signal. Con-current with the last byte of the MP, the RT PORT holds the RT LAST BYTE signal high.

Similarly, during an outbound transfer the RT port chooses to read from buffer A or B, and sets the RT A/B pin. The RT R/W line is held high, and one byte of the NP is read from the buffer each time RT STATUS/DATA is low. Concurrent with the last byte of the MP, the RT port holds the RT LAST BYTE line high, telling the Buffer chip to reset the OAFULL,OBFULL, OACMD, and OBCMD status bits low and set the OAEMPTY and OBEMPTY bits high.

When STATUS/DATA is high the data bus RTD0-7 contains the status information output by the Buffer chip:

| | | |
|---|---|---|
| RTD0 | CAFULL | (Outbound buffer A is Full.) |
| RTD2 | CACMD | (outbound buffer A contains a Command MP.) |
| RTD3 | OBFULL | (Outbound Buffer B is full.) |
| RTD5 | OBCMD | (Outbound buffer B contains a Command MP.) |
| RTD6 | IAEMPTY | (Inbound buffer A is empty.) |
| RTD7 | IBEMPRTY | (Ibound buffer B is empty.) |

Figure 6:
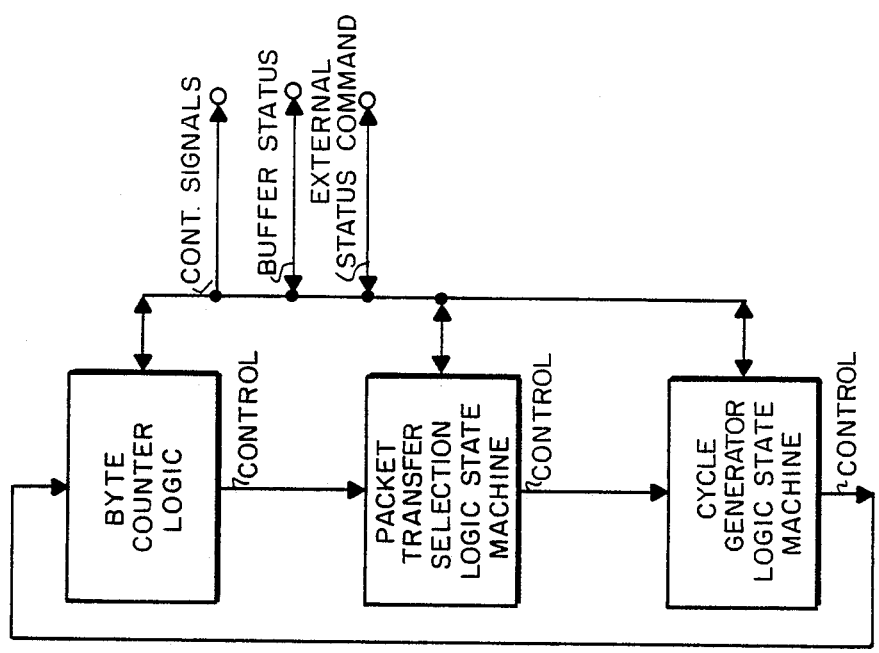
FIG. 6 of the accompanying drawing is a block diagram of the Control Sequencing Logic of FIG. 5.

Referring now to FIG. 6, a block diagram of the control/sequencing logic is shown. The Control Sequencing Logic is the section of the RT port responsible for interrupting the inputs to the chip and generating the correct control signals at the right times to cause the chip to perform its required functions.

This task is performed by three interconnected state machines. In general, outputs from the Byte Counter Logic (along with some internal status information) control the Packet Transfer Selection Logic (PTSLO State Machine (SM); outputs from the PTSL (along with some internal status information) control the cycle Generator Logic (CGL) state machine (SM), an output from the CGL controls the Byte Counter Logic.

Figure 7:
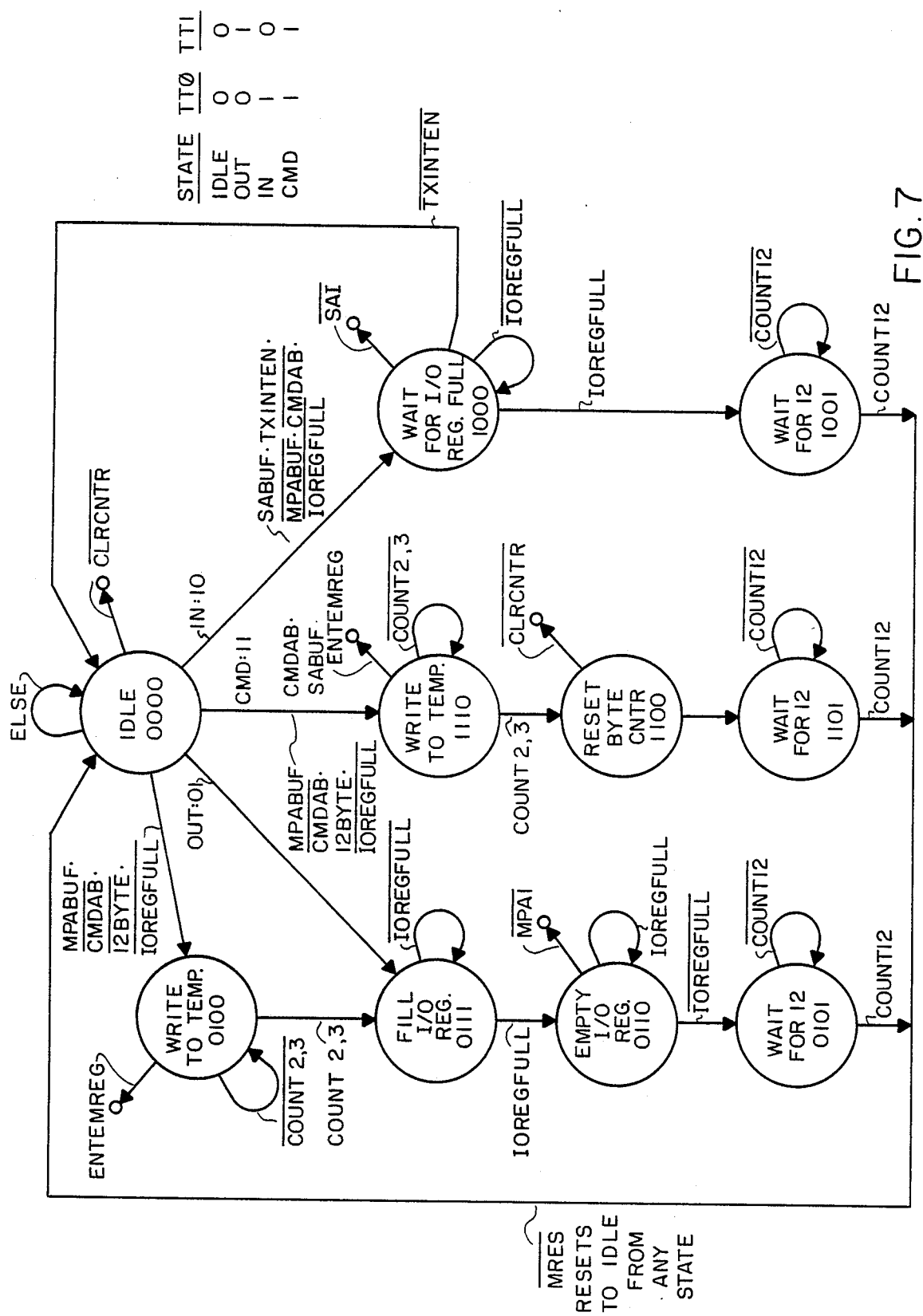
FIG. 7 of the accompanying drawing is a flow diagram of the Packet Transfer Selection Logic of FIG. 6.

The Packet Transfer Selection Logic State Machine (PTSL SM) is responsible for knowing and choosing the operation which the RT port is to perform. In particular, the PTSL must decide when a MP needs to be transferred, and what type of transfer is required. The State Diagram of the PTSL SM is shown in FIG. 7.

The PTSL takes as its input the decoded status of the Buffer Chip (/CMDAB, /SABUF, /MPABUF), the status of the External Interface Data Latch (IOREGFULL), rest (/MRES), the ABI mode (10/12), an External Command (TXINTEN), and certain information about the current byte count (/BYTE12. /COUNT2,3).

The outputs of the PTSL are the current type of MP transfer (tto, tt1), a signal generated to enable the Temporary Register during Command Loopback (ENTEMREG), an external output to notify the CP when a Command Loopback is performed (RT LOOP TIME), a signal to reset the Byte and to external outputs to notify the colocated microprocessor of the status of the Buffer Chip (/MPAI, SAI).

Figure 8:
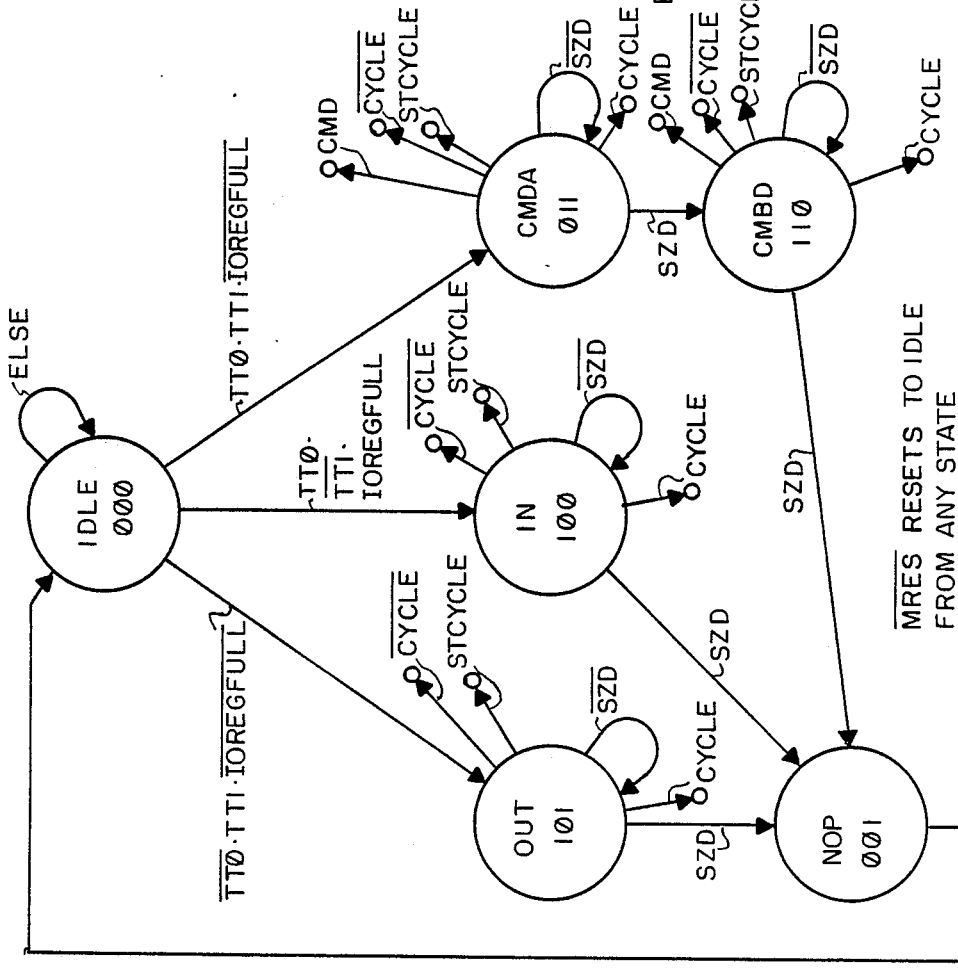
FIG. 8 of the accompanying drawing is a flow diagram of the Cycle Generator Logic of FIG. 6.

The Cycle Generator State Logic Machine (CGL SM) is responsible for generating the correct internal data transfer signals at the correct times. The State Diagram of the CGL SM is shown in FIG. 8.

The inputs of the CGL are the type of MP transfer (TT0, TT1), reset (/MRES), the status of the External Interface data latch (IOREGFULL), the ABI mode (10/12), Temporary Register Control information from the PTSL (ENTEMREG), and certain information about the current byte count (/COUNT 2,3, /COUNT1,2).

The outputs of the CGL are the read/write signals to the Temporary Register (/EDTEMPO, /WRTEMPO, /RDTEMP1, /WRTEMP1), read/write and status signals to the Buffer Interface (/BUFRD, /BUFWR, /CPTB), read/write signals to the External Interface (I/ORD, I/OWR), two other signals controlling acess to the internal data bus (/HRE, /RDZEROS), and an increment signal to the Byte Counter (/TRANSFER).

The Byte Counter Logic maintains a count of the number of bytes of a MP which have been transferred. As each byte transfer is completed, the COL sends the signal /TRANSFER to cause the byte count to be incremented. After the last byte has been transferred, or during reset, the PTSL sends the signal/CLRCNTR to reset the byte count to zero.

The Byte Counter Logic supplies as outputs information about the current byte count (/BYTE12) to the other sections of the RT port.

Figure 9:
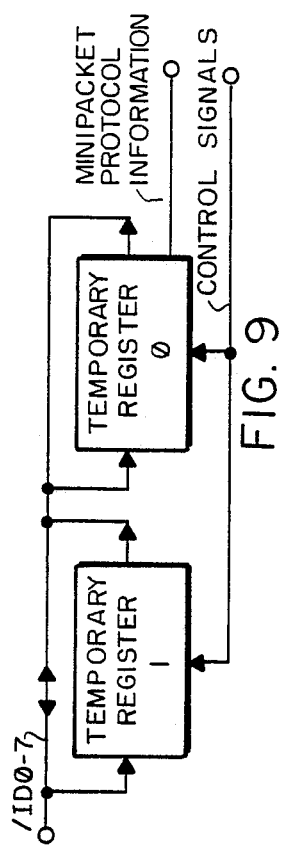
FIG. 9 of the accompanying drawing is a block diagram of the Temporary Registers of FIG. 5.

Referring now to FIG. 9 a block diagram of the Temporary Register is shown. The Temporary Registers are two one-byte wide temporary storage registers used while swapping the TO- and FROM-addresses during Command Loopback. When the ABI is in 10-byte mode, the registers are also used to store the TO-address of an outbound MP. In either case, the T and M bits of the Minipacket Protocol are read from Temporary Register O and passed to the External Interface Minipacket Protocol Logic. In addition, during Command Loopback bit 7 in Temporary Register o is written back to the Internal Data Bus as logic "1" (for the R+ security bit of the MPP).

The Control Signals which govern the read and write timing of the Temporary Registers(/RDTEMPO, /WRTEMPO, /RDTEMP1, /WRTEMP1) are generated by the CGL portion of the Control/Sequencing Logic.

Figure 10:
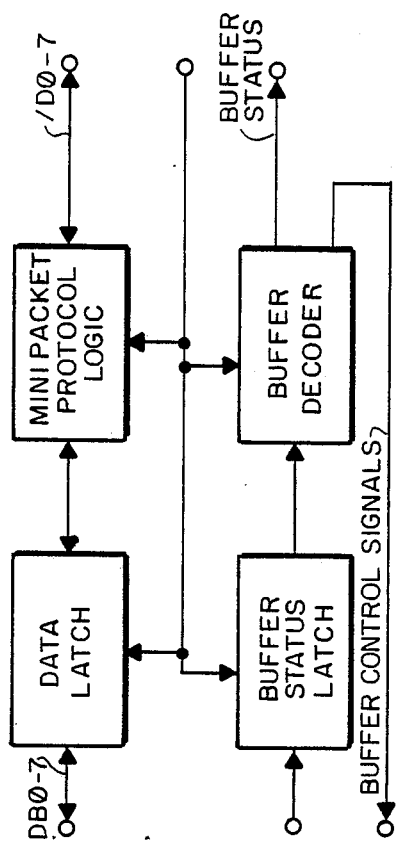
FIG. 10 of the accompanying drawing is a block diagram of the Buffer Interface of FIG. 5.

The Buffer Interface provides the circuitry to allow the RT port to interface with the ABI Custom Buffer Chip. The Buffer Interface latches and interrupts the Buffer Status information. In addition, the Buffer Interface provides the control logic and signals to correctly read from the write to the correct buffer. A block diagram of the Buffer Interface is shown in FIG. 10.

The Buffer Interface Data Latch controls the data path between the Buffer Chip and the internal data bus /ID0-7. The signal /BUFRD from the CCL allows data from the Buffer to pass onto /ID0-7. The signal /HRE enables a holding register to either latch the data on /ID0-7 or to pass it through to the output drivers, which are enabled by the signal /BUFWR from the CCL.

During Command Loopback, the Minipacket Protocol (MPP) Logic inserts a logic "0" in bit 7 of the first byte of the MP (byte 0) as the MP is sent to the Buffer Chip. In 10-byte mode, the MPP Logic inserts a logic "0" in bit 7 of byte 2. The control inputs /BYTEO and /BYTE2 are the Byte Counter; 12Byte is from the External Interface; TT0 and TT1 are from the PTSL.

The Buffer Status Decoder must decode the status of the Buffer, decide which of the dual buffers to use, and issue the appropriate Buffer control signals.

The Status decoding takes as its inputs the signals OAFULL, OACMD, OBFULL, OBCMD, IAEMPTY, and IBEMPTY from the Buffer Status Latch, and produces output signals (?SABUF, /MPABUF, /CMDAB) which are used by the PTSL.

The Buffer Status Decoder must always assure that when a MP is read from the Buffer, the oldest MP in the Buffer is chosen. Similarly, when writing an MP to the Buffer, the MP must be written to the A buffer if it is empty, or to the B buffer only if the A buffer is full. The logic to accomplish this selection requires the inputs OAFULL, OACMD, OBFULL, OBCMD, IAEMPTY, and IBEMPTY from the Buffer Status Latch, and TT0 and TT1 from the PTSL, and generates the signals AOLDEST, /OB, and /IB.

The creation of the Buffer Chip control signals requires /BUFWR, /BUFRD, AND /CPTB from the CCL, TT0 and TT1 from the PTSL, inputs form the Byte Counter (/COUNT2,3, /BYTE11), and the signals /IB, /OB, and AOLDEST as discusses above. The outputs are RT LAST BYTE, RT A/B, RT R/W, and RT STATUS/DATA. When /MRES is true (low), the ABI is in reset, and the four Buffer control outputs are held in a high-impedance state.

Figure 11:
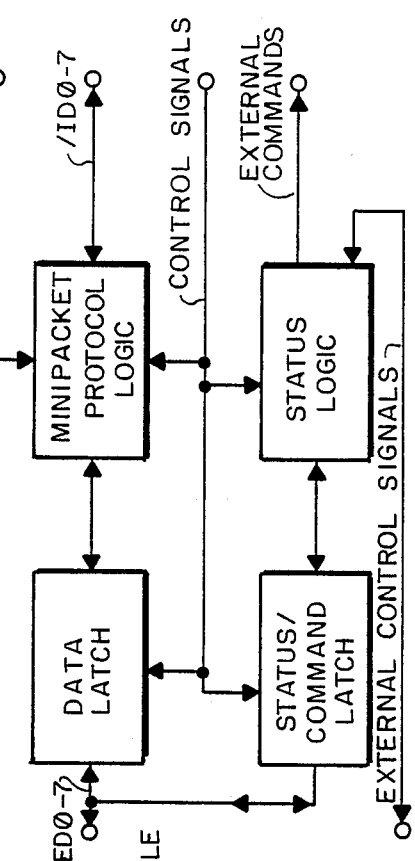
FIG. 11 of the accompanying drawing is a block diagram of the External Interface of FIG. 5.

The External (Microprocessor) Interface provides the Circuitry to allow the RT port to interface to a colocated 65xx microprocessor. The External Interface receives and sends MP data, latches commands from the microprocessor, and provides ABI status information to the microprocessor. In addition, the External Interface handles signals from the microprocessor systems, the ABI Command Processor, and the ABI AB port. A block diagram of the External Interface is shown in FIG. 11.

The colocated 65xx microprocessor controls the External Interface via the signals AO (the lowest order bit of the microprocessor address bus, which signifies Status/Data in this application), /NTSEL (a select signal generated by the microprocessor system), R/W (a microprocessor output signifying read/write, and PH12 (the microprocessor pH12 clock output). These signals combine according to the following truth table:

| PH12 | /NTSEL | 60 | R/W | MEANING |
|------|--------|-----|-----|---------|
| 0 | x | x | x | — |
| x | 1 | x | x | — |
| 1 | 0 | 0 | 0 | Data Write |
| 1 | 0 | 0 | 1 | Data Read |
| 1 | 0 | 1 | 0 | Command Write |
| 1 | 0 | 1 | 1 | Status Read |

The External Interface Data Latch controls the flow of MP data between the External Data Bus EDO-7 and the Internal Data Bus /IDO-7.

When a Data Write command is received from the microprocessor, the byte of data on EDO-7 is latched into the IO Register, causing the IOREGFULL signal to be set high. When /IORD is asserted by the CGL, the byte of data is allowed onto the Internal Data Bus /10-7 and IOREGFULL is reset low.

Similarly, when the CGL asserts /IOWR, data from /IDO-7 is latched into the IO Register, and IOREGFULL is set high. When a Data Read command is received from the microprocessor, the byte of data is transferred from the IO Register onto EDO-7 and the IOREGFULL signal is reset low.

When the ABI is in 10-byte mode, the MPP logic will insert the T and M bits (saved in Temporary Register O) into bits 7 and 6 of the first byte of each MP to be sent to the microprocessor. In addition to T and M, this operation uses a timing signal from the Byte Counter (/BYTE2) and the ABI mode signal from the External Interface (12BYTE).

The External Interface Status Command Latch provides for bi-directional communication between the ABI and the colocated 65xx microprocessor. The Status and Command bytes are described in full in the Function Description portion of this specification.

When the microprocessor sends the Command Write command, the data on EDO-7 are latched into the Command Register. When the microprocessor sends the Status Read command, the ABI status information is driven out onto EDO-7.

The External Interface Status Logic monitors the status of the ABI, and prepares the status information for the microprocessor.

Most of the ABI status information is held by the Status logic to be read by the microprocessor via the Status register. The signal SAIE is echoed directly from the Command register, MPA and SA come from the PTSL; and ICREGFULL is the External Interface Data Latch's report on the status of the IO Register. The signals SWRESET, WDTTO, and /PCC are combined to form the status bit ABI RESET. ABI REST is latched, and the latch is cleared only after a Command Write signal is received. WDT TIME OUT and ABI OVERRUN are latched, as is LAST BYTE, which signifies that MP transfer has been completed. These three latched signals are cleared after a Status Read command.

Several signals are received directly from or sent directly to the outside world via pins on the chip. The ABI mode is set by the pin 10/12, and signals names 10/12 and 12/BYTE are used within the RT port. The signal WDTTO is received from the CP and becomes the internal signal WOT TIME OUT. The signal/AB OVERRUN is received from the AB port and becomes the internal signal AB1 OVERRUN.

Whenever the ABI RESET status bit is true, or the /MRES input from the CP is true, internal /MRES signal is used to put the RT port into reset. When ABI RESET is true, the external output signal /RESET is sent to the CP.

If either ABI OVERRUN or WDT TIME OUT is true, the external interrupt signal/ERROR is sent to the microprocessor system.

Figure 12:
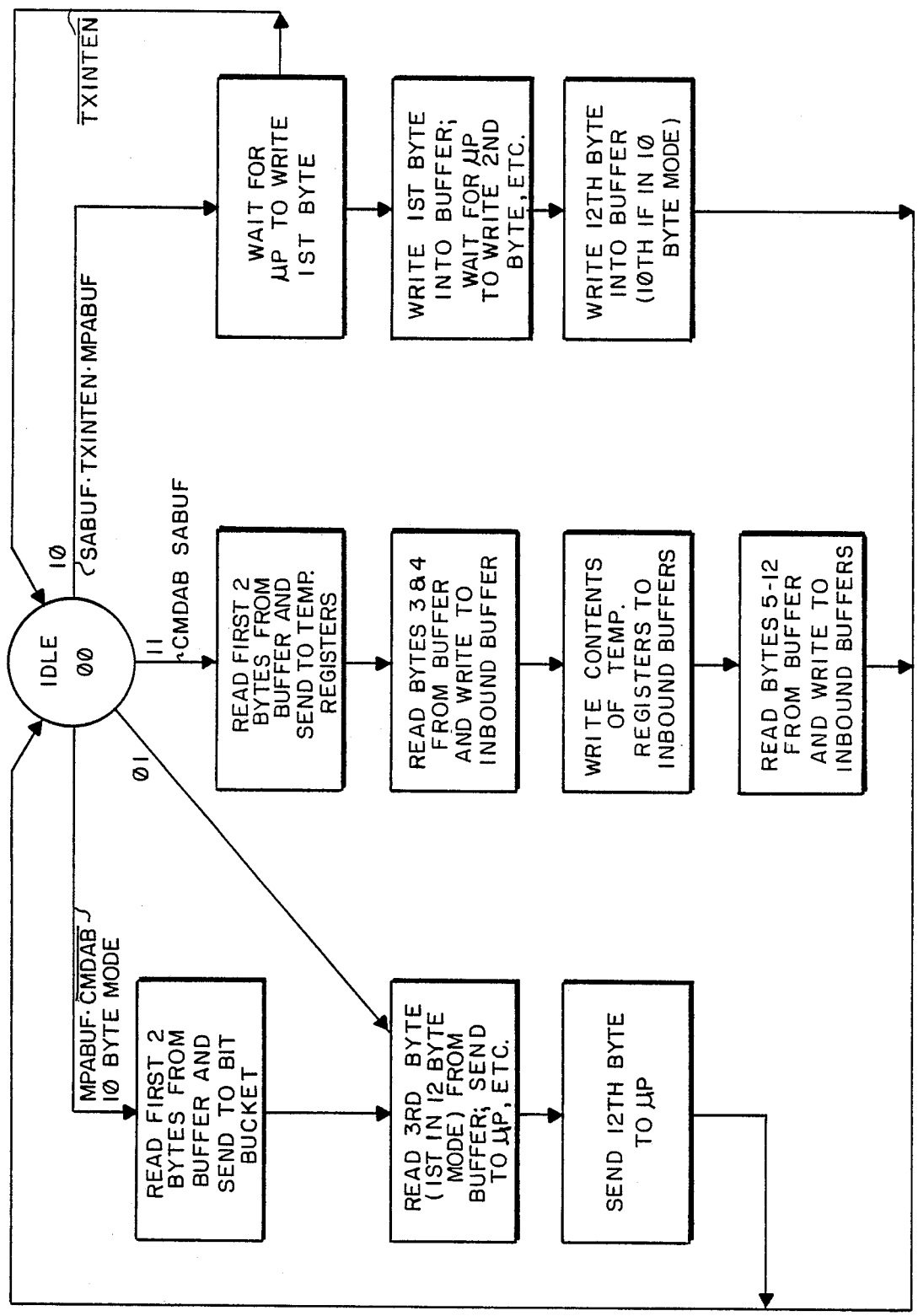
FIG. 12 of the accompanying drawing is a flow diagram of the RTPORT of FIG. 5.
Figure 13:
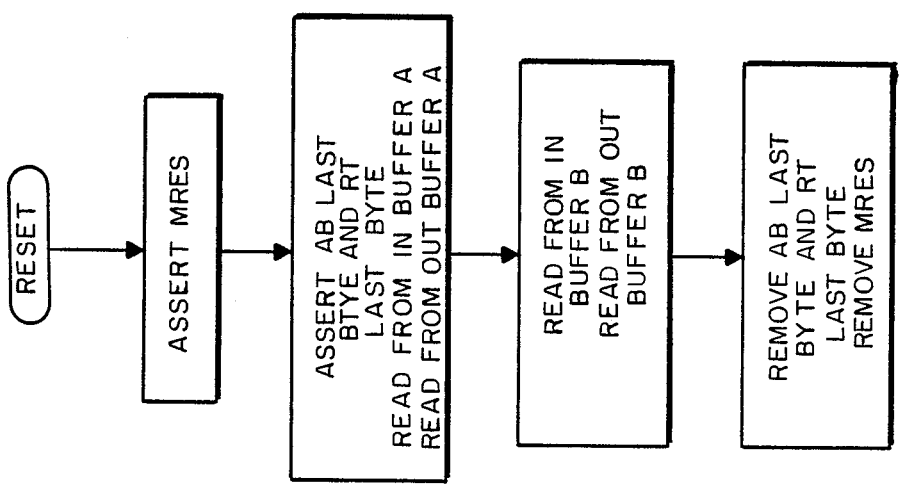
FIG. 13 of the accompanying drawing is a flow diagram of the reset sequence for the ABPORT and the RTPORT.

A flow diagram for the RTPORT is shown in FIG. 12 and the reset sequence for the ABPORT and RTPort is shown in FIG. 13.

Figure 14:
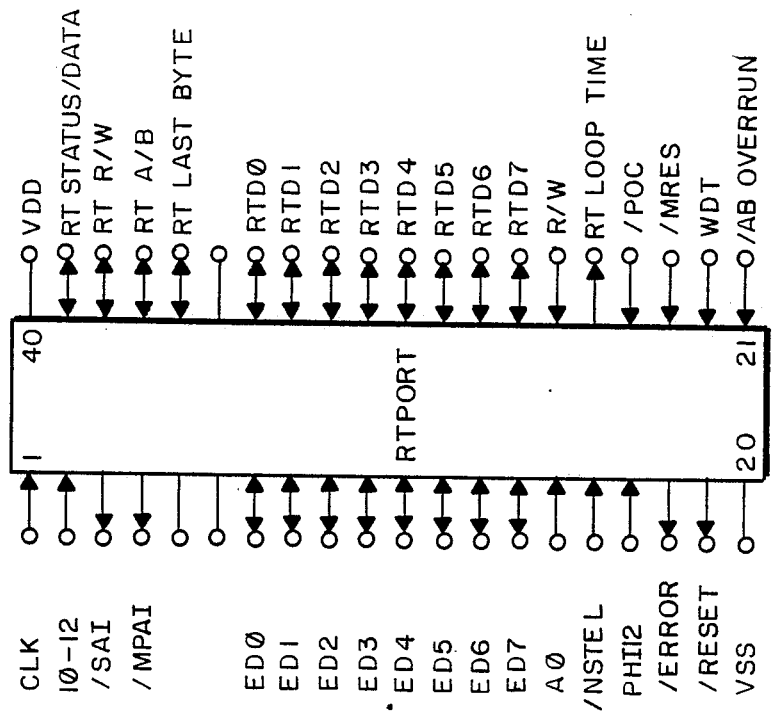
FIG. 14 of the accompanying drawing is a pinout diagram of the RTPORT.

A pinout diagram for the RTPORT is shown in FIG. 14, and the signals identified therein are described in the following table.

ClK (input) is the system clock for the ABI, running at 1.544 MHz. The clock is taken from the Local Packet Bus.

10/12 (input) defines the data format to be used for the microprocessor interface. In 12-byte mode, all twelve bytes of each Minipacket (MP) are passed to and from the microprocessor. In 10-byte mode, Byte 2 and Byte 3 of each outbound MP (from the Arbitrated Bus to the microprocessor) are deleted. Inbound MPs (from the miroprocessor) will have 2 bytes of zeros inserted between the second and third bytes sent from the microprocessor. Currently only the 10-byte mode is used in the ABI set.

/SAI (output) is an interrupt signal, Space Available Interrupt, sent to the microprocessor when the RT port is waiting to pass an inbound MP to the custom buffer.

/MPAI (output) is an interrupt signal, Minipacket Available Interrupt, sent to the microprocessor when the RT port is waiting to pass an outbound MP to the microprocessor.

EDO-ED7 (input/output) are the bi-directional data path between the RT port and the microprocessor. This path is used to transfer MPs one byte at a time to and from the microprocessor, and to pass control and Status bytes between the microprocessor and the RT port.

AO (input) is the Least Significant Bit of the microprocessor Address bus, and acts as a Status/DATA signal to the RT port, controlling the type of data transferred over EDO-ED7.

/NTSEL (input) is a chip enable input from the microprocessor system, signaling that a byte is to be transferred over EDO-ED7.

PH12 (input) is the microprocessor output clock, used by the RT port to provide a clean timing reference for data transfer over EDO-ED7.

/ERROR (output) is an interrupt signal to the microprocessor saying that either the Watch Dog Timer on the Command Processor has expired, or the AB port has had an overrun error.

/RESET (output) is an output to the Command Processor (CP) instructing the CP to reset the ABI. The RT port will hold /RESET low in response to a /POC input, a Software Reset Command from the microprocessor, or a Watch Dog Timer time out.

/AB OVERRUN (input) is a signal from the ABI AB port saying that there has been a Local Packet Bus overrun error.

WDTTO (input) is a signal from the Command Processor saying that the Watch Dog Timer has expired. Receipt of this signal causes the RT port to assert /RESET to the CP.

/MRES (input) is an input from the Command Processor instructing the RT port to reset. While /MRES is asserted, the outputs of the RT LAST BYTE, RT A/B, RT R/W RT STATUS/DATA pins are in a high impedance state.

/POC (input) is the Power-On Clear signal from the microprocessor system, instructing the RTPort to send /RESET to the Command Processor and then to reset itself.

RW is an input from the microprocessor defining the direction of data flow over EDO-ED7. When the signal is high, data is sent from the RTPort to the microprocessor. When the signal is low, the RTPort receives data from the microprocessor.

RT LOOP TIME (output) is an output to the Command Processor saying that RT port is looping-back a Command MP toward the Custom Buffer Chip.

RTDO-RTD7 (input/output) are the bi-directional data path between the RT port, the ABI Custom Buffer Chip, and the Command Processor. The path is multiplexed to transfer MPs one byte a time between the RTPort and the Buffer Chip when RT STATUS/DATA is low, and to provide the Buffer status to the RT port when RT STATUS/DATA is high.

RT LASTBYTE (output tri-state) is sent to the Custom Buffer Chip during any MP transfer to specify the buffer to be read from or written to. The RTPort will select the oldest outbound MP in the buffer first. During reset, this pin is in the high-impedance state.

RT R/W (output tri-state) is sent to the Custom Buffer Chip to select the direction to a MP transfer. When the signal is high, one byte at a time is transferring from the Buffer to the RTPort. When RT R/w is low, one byte at a time is transferred from the RTPort to the Buffer. During reset, this pin is in the high impedance state.

RT A/B (output tri-state) is sent to the Buffer Chip to select the Buffer A or B for the MP transfer. When the signal is high, the A-Buffer transfers. When the signal is low, the B-Buffer transfers.

RT STATUS/DATA (output tri-state) is sent to the Custom Buffer Chip to specify the type of data to be on RTDO-RTD7. When the signal is high, the Buffer status is put on to the data bus; when the signal is low the bus is used for MP transfer. During reset, this pin is in the high impedance state.

Figures 15, 16:
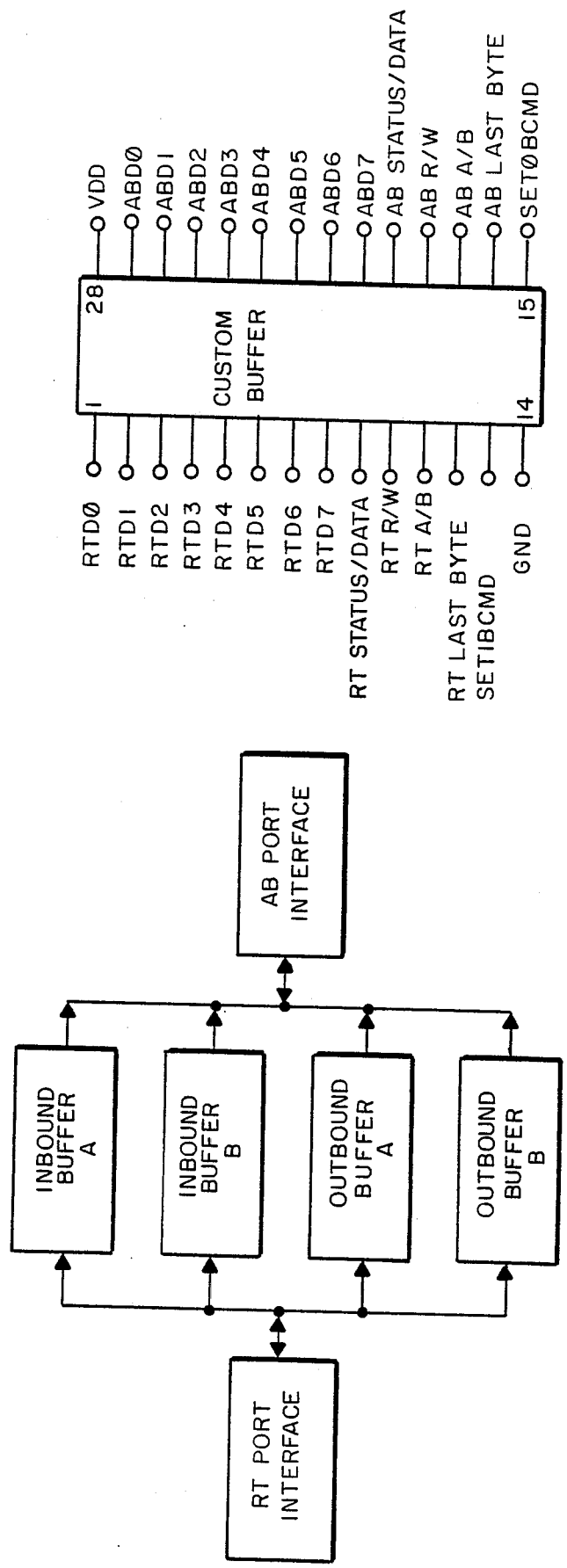
FIG. 15 of the accompanying drawing is a block diagram of the Custom Buffer Chip.
FIG. 16 of the accompanying drawing is a pinout diagram of the Buffer Chip.

Referring now to FIG. 15, a block diagram of the Custom Buffer Chip is shown. This chip provides bidirectional double-buffering for mini-packets (MP) passed between the AB Port and the RT Port. The buffering is achieved using four byte-wide shift registers. Each shift register is 12-bits in length. The AB Port and the RT Port write to the two outbound buffers and read from the two inbound buffers at different times.

During a write operation the writing AB or RT Port chooses which buffer, A or B, it wishes to write to and sets its A/B pin appropriately. The R/W line is held low, and one byte of the MP is written into the buffer on each rising edge of the STATUS/DATA signal. Concurrent with the last byte of the MP, the writing Port will hold its LAST BYTE signal high. In addition the Command Processor chip examines any MP being written into the buffer; if the MP is a Command, the Command Processor raises the appropriate SETIBCMD or SETOBCMD signal concurrent with the last byte of the MP. The Buffer chip uses these signals to set its OAFULL, OBFULL IAFULL, IBFULL, OACMD, OBCMD, IACMD, or IBCMD status bits high and reset the OAEMPTY, OBEMPTY, IAEMPTY, or IBEMPTY bit low. The meaning of these status bits is explained in the pinout diagram.

Similarly, during a read operation the reading AB or RT Port chooses to read from buffer A or B, and set its A/B pin. The R/W line is held high, and one byte of the MP is read from the buffer each time STATUS/DATA is low. Concurrent with the last byte of the MP, the reading Port holds its LASTBYTE line high, telling the Buffer chip to reset it IAFULL, IBFULL, OAFULL, OBFULL, IACMD, IBCMD, OACMD, or OBCMD status bits low and set the IAEMPTY, IBEMPTY, OAEMPTY, or OBEMPTY bit high.

During reset of the ABI, the Command Processor manipulates the A/B, R/W, STATUS/DATA, and LASTBYTE lines to clear the buffers and status bits.

The ABI Buffer Chip does not have a dedicated reset pin. The only storage elements that require initialization are the buffers themselves. This is accomplished by filling the buffers with all bytes set high and, thus, indicating that the buffers are ready to receive a new MP from either the AB or RT Port source.

The chip does not have a synchronous clock. Data is gated to and from the chip by sensing the edge of the STATUS/DATA signal.

The pinout diagram for the Buffer Chip is shown in FIG. 16, and the following table provides a description of the signals identified in that figure.

RTDO-RTD7 form the data path between the Buffer Chip, the RT Port, and the Command Processor. This bus is bi-directional, with tri-state I/O on the Buffer Chip. This data path also provides Buffer Chip status information when RT STATUS/DATA is high:

| pin | 1 RT OAFULL | (Outbound Buffer A is full) |
|---|---|---|
|  | 3 RT OACMD | (Outbound Buffer A contains a Command MP) |
|  | 4 RT OBFULL | (Outbound Buffer B is full) |
|  | 6 RT OBCMD | (Outbound Buffer B contains a Command MP) |
|  | 7 IAEMPTY | (Inbound Buffer A is empty) |
|  | 8 IBEMPTY | (Inbound Buffer B is empty) |

RT STATUS/DATA allows RTDO-RTD7 to be multiplexed between acting as a bi-directional data path and acting as a path for buffer status information to be output by the Buffer Chip.

RT R/W defines the direction of the data transfer on RTD0-RTD7. When the signal is high, the transfer is from the Buffer to the RT Port. When the signal is low, the transfer is from the RT Port to the Buffer and the Command Processor. The STATUS/DATA signal must be low to allow the transfer.

RT A/B allows the RT Port to specify which of the dual buffers on the Buffer Chip is to be read from or written to.

RT LASTBYTE is sent by the RT Port during the 12th byte of data written from the RT Port to the Buffer Chip or read from the Buffer Chip to the RT Port.

SETIBCMD is sent by the Command Processor during the 12th byte of a valid Command Minipacket written from the RT Port to the Buffer Chip.

SETOBCMD is sent by the Command Processor during the 12th byte of a valid Command Minipacket written by the AB Port to the Buffer Chip.

AB LASTBYTE is sent by the AB Port to the Buffer Chip during the 12th byte of a minipacket transfer between the AB Port and the Buffer.

AB R/W defines the direction of the data transfer on ABD0-ABD7. When the signal is high, the transfer is from the Buffer to the AB Port. When the signal is low, the transfer is from the AB Port to the Buffer and the Command Processor. The STATUS/DATA signal must be low to allow the transfer.

AB A/B allows the AB Port to specify which of the dual buffers on the Buffer Chip is to be read from or written to.

AB STATUS/DATA allows ABD0-ABD7 to be multiplexed between acting as a bi-directional data path and acting as a path for Buffer status information to be output by the Buffer Chip.

ABDO-ABD7 form the data path between the Buffer Chip, the AB Port, and the Command Processor. The bus is bi-directional, with tri-state outputs on the Buffer Chip. This data path also provides Buffer Chip status information when AB STATUS/DATA is high:

| pin | 27 | AB IAFULL | (Inbound Buffer A is full) |
|---|---|---|---|
|  | 25 | AB IACMD | (Inbound Buffer A contains a Command MP) |
|  | 24 | AB IBFULL | (Inbound Buffer B is full) |
|  | 22 | AB IBCMD | (Inbound Buffer B contains a Command MP) |
|  | 21 | AB OAEMPTY | (Outbound Buffer A is empty) |
|  | 20 | AB OBEMPTY | (Outbound Buffer B is empty) |

It will be obvious to those skilled in the art that numerous modifications of the present invention can be made without departing from the spirit of the invention which shall be limited only by the scope of the claims appended hereto.

What is claimed is:

1. An arbitrated bus interface circuit for use in a system including a bus and an external processor, said arbitrated bus interface comprising:
   an arbitrated bus port connected to said bus and operated to acknowledge receipt of data from said bus; said arbitrated bus port comprising;
   address recognition means connected to said bus and operated to decode mini packets and accept those having a predetermined address bit pattern;
   frame timing means connected to said bus and operated to detect a sync signal in each mini packet and provide a corresponding timing signal;
   flow control means connected to said bus and operable to provide busy and packet transferred signals;
   a first custom buffer interface connected to a custom buffer circuit and said flow control means and operable to detect the availability of mini packets from an outbound buffer space in said custom buffer circuit; and
   a command processor interface connected to said custom buffer circuit and operated to store parameter information associated with each mini packet;
   a receiver-transmitter port connected to said external processor and operable to interrupt said external processor;
   said receiver-transmitter port comprises:
   a second custom buffer interface operated to transfer data to and from the custom buffer circuit;
   an external processor interface connected to said second custom buffer interface and operated to transfer data to and from said external processor; and
   control means connected to said second custom buffer interface and said external processor interface and operated to control the transfer of mini packets between the second custom buffer interface and the external microprocessor interface;
   a custom buffer circuit comprising inbound and outbound shift registers and connected between said arbitrated bus port and said receiver-transmitter port and operated to store data received from and transmitted to said arbitrated bus port and said receiver-transmitter port, and further operated to provide an interrupt enable signal in response to storing a predetermined amount of data, said receiver transmitter port operated in response to said interrupt enable signal to interrupt said external processor; and
   a command processor connected to said arbitrated bus port, said receiver-transmitter port and said custom buffer circuit, and operated to arbitrate on said bus.

2. An arbitrated bus interface circuit as claimed in claim 1, wherein said command processor comprises:
   an inbound byte counter operated to count the number of bytes in an inbound minipacket;
   an inbound command detector connected to said inbound byte counter and operated to detect different command signals in particular bytes of said inbound minipackets;
   an outbound byte counter operated to count the number of bytes in an outbound minipacket; and
   an outbound command detector connected to said outbound byte counter and operated to detect different command signals in particular bytes of said outbound minipackets.

* * * * *